United States Patent
Miura et al.

(10) Patent No.: US 6,576,212 B2
(45) Date of Patent: Jun. 10, 2003

(54) PROCESS FOR THE PRODUCTION OF CARBONIZED MATERIAL

(75) Inventors: Masakatsu Miura, Kitahiroshima (JP); Harumi Kaga, Sapporo (JP); Kozo Ishizaki, Sapporo (JP)

(73) Assignee: Secretary of Agency of Industrial Science and Technology (JP)

( * ) Notice: Subject to any disclaimer, the term of this patent is extended or adjusted under 35 U.S.C. 154(b) by 0 days.

(21) Appl. No.: 09/739,298

(22) Filed: Dec. 19, 2000

(65) Prior Publication Data

US 2002/0064495 A1 May 30, 2002

(30) Foreign Application Priority Data

Nov. 28, 2000 (JP) ........................................ 2000-361508

(51) Int. Cl.[7] .............................. D01F 9/12; D01F 9/16; D01F 9/17
(52) U.S. Cl. ................................. 423/447.4; 423/445 R; 423/447.6; 423/447.8; 423/447.9; 502/430
(58) Field of Search .......................... 423/445 R, 447.1, 423/447.4, 447.6, 447.7, 447.8, 447.9; 502/430; 588/209

(56) References Cited

U.S. PATENT DOCUMENTS

| | | | | | |
|---|---|---|---|---|---|
| 4,592,762 | A | * | 6/1986 | Babu et al. | 252/373 |
| 5,364,821 | A | * | 11/1994 | Holland | 502/5 |
| 5,444,031 | A | * | 8/1995 | Hayden | 110/346 |
| 2002/0103081 | A1 | * | 8/2002 | Wolff | 502/413 |

OTHER PUBLICATIONS

Krieger–Brockett, B. "Microwave Pyrolysis of Biomass.", Res. Chem. Intermed., 1994, no month, 20(1), 39–49.*

* cited by examiner

*Primary Examiner*—Steven Bos
*Assistant Examiner*—Anthony Kuhar
(74) *Attorney, Agent, or Firm*—Lorusso, Loud & Kelly

(57) ABSTRACT

A process of producing a carbonized material, which includes a step of treating the biomass with a microwave for a period of time sufficient to carbonize an inner region thereof but insufficient to carbonize an outer region thereof, thereby obtaining a partly carbonized product, a step of contacting the partly carbonized product with an oxidizing gas for a period of time sufficient to carbonize the outer region, thereby obtaining a completely carbonized product, and a step of cooling the completely carbonized product in a non-oxidizing atmosphere.

9 Claims, No Drawings

PROCESS FOR THE PRODUCTION OF CARBONIZED MATERIAL

BACKGROUND OF THE INVENTION

This invention relates to a process of producing a carbonized material from biomass.

One known method of producing activated carbon includes carbonizing a wood material, such as wood chips or sawdust, at a temperature of at least 250° C. The carbonized product is then activated with a gas such as steam.

During the heating step, the carbonization starts at surfaces and gradually proceeds towards the inside. Thus, the known method has a problem that tar produced by pyrolysis is apt to deposit within pores of the carbonized product. In particular, when the raw material is large sized wood chips, the tar deposition becomes significant and, additionally, the carbonization requires a long time in order to carbonize the central region thereof.

JP-B-H06-72003 discloses a method of simultaneously producing anhydo-saccharides and a carbonized product from a cellulose material by microwave heating. The specific surface area of the carbonized product obtained with the method is 600–660 $m^2/g$ at a center region thereof, about 250 $m^2/g$ at an intermediate region and as small as 6–10 $m^2/g$ at a surface region.

SUMMARY OF THE INVENTION

It is an object of the present invention to provide a process of producing a carbonized material having a large specific surface area with high efficiency from biomass.

In accordance with the present invention there is provided a process of producing a medium grade carbonized material from a biomass having an inner region and an outer region contiguous to the inner region, comprising the steps of:
(a) treating the biomass with a microwave for a period of time sufficient to carbonize the inner region but insufficient to carbonize the outer region, thereby obtaining a partly carbonized product;
(b) contacting the partly carbonized product with an oxidizing gas for a period of time sufficient to carbonize the outer region, thereby obtaining a completely carbonized product; and
(c) cooling the completely carbonized product in a non-oxidizing atmosphere.

By subjecting the cooled product obtained in step (c) to a gas activation treatment, a high grade carbonized material may be obtained.

The present invention has the following effects:
(1) A large sized carbonized material may be obtained by using a large sized biomass in the carbonized material producing step. Thus, unlike the conventional method which should handle fine char, the working environment is greatly improved.
(2) A great cost down can be achieved, because costs for crushing raw material wood into saw dust or chips are no longer necessary. Since a carbonized material in the form of a large block is brittle, it is very easy to pulverize the material. Therefore, it is not necessary to use an expensive high-strength pulverizing machine. A raw material having any size and any shape may be used.
(3) It is possible to easily prepare coarse carbonized material having different sizes by sieving coarsely pulverized carbonized material of any size. Thus, a briquetting step is no longer needed and, hence, reduction of activity due to the use of a binder for briquetting is not caused. If finely divided material is desired, it is easy to obtain such a material by simply pulverizing a coarse material.
(4) The use of the coarsely pulverized carbonized material is effective for reducing pressure loss in a packed bed and preventing scattering of particles in a packed tower.
(5) A high grade carbonized material can be produced within a short time without a briquetting step or a step of using a binder.

Other objects, features and advantages of the present invention will become apparent from the detailed description of the preferred embodiments of the invention to follow.

DETAILED DESCRIPTION OF THE PREFERRED EMBODIMENTS OF THE INVENTION

A biomass is used as a raw material for carbonization in the present invention. As the biomass, any plant material may be used as long as it can be carbonized by heating, such as a material containing cellulose, hemicellulose and lignin as major components. Examples of biomass include wood materials, plant cellulose materials, corn cores, shells of fruits (e.g. shells of coconut, walnut and ivory nut), seeds of fruit (e.g. seed of peach), husks (husks of chestnut, buckwheat and rice), bagasse, cotton, cotton fibers, paper and pulp. The wood materials include large sized materials, such as raw wood, wood blocks and timber, small sized wood materials, such as saw dust and wood chip, and molded bodies of the small sized wood materials. The size of the biomass raw material is not specifically limited and ranges from small particles to large sized materials. The volume of one piece of the biomass raw material is at least 0.05 $cm^3$, preferably at least 70 $cm^3$. The upper limit of the volume is not specifically limited but is generally about 50,000 $cm^3$.

In the present invention, the use of large sized wood materials is preferred. Such materials include raw wood, wood blocks, timber and molded bodies of small wood materials such as saw dust and wood chips. The wood blocks include blocks obtained by removing bark from raw wood, blocks obtained by cutting raw wood, and blocks obtained by press molding pulp fibers and drying the molding. The sectional area of an end of wood block is 1.5–2000 $cm^2$, preferably 80–800 $cm^2$, whole the length thereof is 1–700 cm, preferably 2–40 cm. The timber may be large chips obtained by cutting wood or chips obtained by cutting wood into a determined size. The wood materials may have a major axis having a length of 1–200 cm, preferably 10–40 cm and may have any shape, such as preferably, columns, spheres and rectangular parallelepiped.

In the process for producing carbonized materials according to the present invention, the above-mentioned biomass raw material is subjected to a microwave heating treatment in an irradiation chamber. The microwave having a frequency of 1000–6000 MHz may be used. From the standpoint of the Wireless Telegraphy Act, penetration depth and heating speed, the use of a microwave having a frequency of 2450 MHz will be advantageous. When microwave irradiation is applied to the material, the irradiation chamber may be maintained in an inert gas atmosphere, a low oxygen concentration atmosphere. The chamber may be kept under a flow of a non-oxidizing gas such as nitrogen, carbon dioxide or steam. By this, the carbonization of the raw material may be performed with ease without danger. When the microwave irradiation chamber is maintained under a reduced pressure and in a low oxygen concentration atmosphere, it is easy to withdraw thermally decomposed gases generated from the raw material. It is also possible to prevent tar deposition on the carbonized product.

The carbonization of the biomass material by microwave irradiation rapidly proceeds from inside thereof. The microwave treatment time of course varies with an output power and load of the microwave. In the case of a columnar wood material having a diameter of 6 cm and a water content of 10%, the irradiation time is generally 4–15 minutes with an output power of 0.5–3 kW. In the case of a columnar wood material having a diameter of 30 cm, the treatment time is generally 30–120 minutes. A columnar material having a diameter of 30 cm generally requires 30–100 minutes treatment time with 3 kW output power.

In the carbonization of the biomass by microwave irradiation, the microwave irradiation is stopped before it has been completely carbonized. The carbonization of the material with the microwave irradiation proceeds from inside thereof so that the inside region is carbonized with good efficiency. However, the surface region is not easily carbonized. A long microwave irradiation time is required in order to completely carbonize the material up to the surface region. This causes high costs for electric power. Thus, in the present invention, the microwave irradiation is stopped when the inside region has been carbonized but the outside and surface region remains uncarbonized (partly carbonized state).

The fact that the inside region has been carbonized may be confirmed by generation of white or yellow brown decomposition gas, though no change may be found in the outside region. The microwave irradiation is stopped at any time point after the generation of the thermal decomposition gas and during the period where the outside region is not completely carbonized but an uncarbonized part is still present. The carbonized part has a black surface color, while the uncarbonized part is not black but is generally brown.

In the present invention, the uncarbonized part is 5–70%, preferably 10–30%, based on the total weight of the partly carbonized product.

The partly carbonized product obtained by the above carbonization step is then contacted with an oxidizing gas. The partly carbonized product obtained by the microwave heating has a high inside temperature of 300–1,000° C. The nearer to the core, the higher becomes the temperature. Thus, when the partly carbonized product having a hot core produced by the microwave irradiation is contacted with an oxidizing gas, the oxidizing gas penetrate into the inside thereof through conduits and fine cracks to cause oxidation, so that the entire mass has a high temperature. At high temperature regions having a temperature of at least 220° C., hemicellulose undergoes exothermic reactions. At higher temperature regions, cellulose and lignin undergoes exothermic reactions, so that the temperature increase is promoted. Thus, the oxidation proceeds successively from the inside toward surface regions to create high temperature conditions.

Cracks are apt to be formed due to abrupt establishment of high temperature. When the cracked portions and surface portions which are contacted with the oxidizing gas have a temperature higher than the ignition temperature thereof, volatile combustible gases generated from the incompletely carbonized product are ignited and flamed. When the amount of the volatile matter generated decreases, the flame becomes small to form an incandescent carbonized material.

When the microwave treated product contains more than 50% of an uncarbonized part, the penetrability of the oxidizing gas thereinto is not good. In this case, by forcibly contacting the inside of such a product with the oxidizing gas by, for example, forming cracks therein, an induced oxidation may be accelerated so that the complete carbonization may be swiftly achieved by the heat of flaming combustion. However, when the carbonized product contains more than 50% of an uncarbonized part, the flame is increased and, hence, the proportion of a part carbonized by flames increases. As a consequence, the grade of the carbonized product is unavoidably lowered.

In the manner described above, the incompletely carbonized product obtained by microwave heating can be converted to completely carbonized material without extra thermal energy. As the oxidizing gas, oxygen-containing gas such as air or oxygen by itself may be used.

At a time point where flame is no longer formed in the above complete carbonization step, the feed of the oxidizing gas is terminated. The product is then cooled under non-oxidizing conditions. The cooling may be by allowing the product to stand for cooling or may be forced cooling by using a cooling medium such as a cooling gas. The non-oxidizing conditions may be established by stopping the feed of the oxidizing gas or by feeding a non-oxidizing gas such as nitrogen gas, steam or carbon dioxide gas.

The thus obtained medium grade carbonized material has low content of deposits of tar residues on fine pores thereof. Since the pores are in a clean state, it shows high adsorbing capacity and is well suitable for an adsorbing agent.

The completely carbonized material may be easily ground, if desired, to obtain a coarsely ground materials having a desired size. The volume of one piece of the coarsely ground materials is 5000 $cm^3$ or less, preferably 3 $cm^3$ or less. The lower limit is not specifically limited, but is generally 0.05 $cm^3$. The completely carbonized material generally has a length of its major axis of 1–400 mm, preferably 2–30 mm. The completely carbonized material may be used as a medium grade carbonized material by itself. The medium grade carbonized material has a merit that the production costs therefor are low.

The thus obtained completely carbonized material or coarsely pulverized product thereof may be converted into a high grade carbonized material (activated carbon) by being subjected to a gas activation treatment. Conventional methods may be used for activation of the completely carbonized material with a gas. The gas activation method may be a method in which the carbonized material is reacted at a high temperature with steam, carbon dioxide gas (combustion gas), oxygen (air) or other oxidizing gas. The activation temperature is 750–1,300° C., preferably at least 840° C., more preferably at least 850° C.

In the present invention, a completely carbonized product of a large size obtained by using a large sized raw material may be used as a medium grade carbonized material as such. Alternatively, the completely carbonized product may be, if necessary, easily pulverized and classified to obtain a medium grade carbonized material having a desired size or a desired particle diameter.

Further, according to the present invention, a high grade carbonized material in the form of desired fine particles may be obtained by subjecting fine carbonized product, obtained by pulverizing the completely carbonized product and, if necessary, by classifying the pulverized product, to a gas activation treatment.

In accordance with the present invention, there are provided medium and high grade carbonized materials having a length of their major axis of 0.05 mm to 2 m, preferably 0.2 mm to 300 mm.

The medium grade carbonized material of the present invention has a specific surface area, by BET specific surface area measuring method, of at least 400 $m^2/g$, preferably at least 500 $m^2/g$. The upper limit is generally 660 $m^2/g$, in the case of larch.

The high grade carbonized material of the present invention has a specific surface area, by BET specific surface area measuring method, of at least 800 $m^2/g$, preferably at least 1,200 $m^2/g$. The upper limit is generally 3,000 $m^2/g$.

The following examples will further illustrate the present invention.

EXAMPLE 1

A wood block of larch (diameter: 340 mm, height: 300 mm; weight: about 13 kg) was carbonized by heating with microwave. Microwave was irradiated for about 80 minutes from a microwave generator of an oscillation frequency of 2450 MHz and maximum output power of 3 kW. The microwave was irradiated while feeding a small amount of nitrogen gas to a microwave chamber and while evacuating the chamber with a pump so that the chamber was maintained in a slightly reduced pressure. The wood block thus treated was found to be almost completely carbonized except only part of its surface region. The yield of the carbonized product was 35%.

The carbonized product, while hot, was placed in a 100 liter stainless steel vessel. When air was blown against the carbonized product, it assumed high temperature. Thus, the uncarbonized surface part flamed and burned. The burning continued about 3 minutes. When the flame disappeared to obtain an incandescent carbonized material, the vessel was closed with a lid to shutout air and allowed to be cooled. A completely carbonized material was thus obtained within a short period of time (about 90 minutes). The thus obtained incompletely combusted material after the microwave irradiation had a specific surface area (by the BET method) of 580–630 $m^2/g$ which was several times as great as that of larch charcoal (140–220 $m^2/g$; product of Shimokawa-machi) produced in a charcoal kiln. The maximum value of specific surface areas of charcoal described in literatures is at most 300–400 $m^2/g$. Thus, the specific surface area of the incompletely combusted material carbonized by the microwave irradiation for a short time was apparently larger than that of the charcoal and was near that of commercially available activated carbon. The scanning electron microscopic analysis revealed that part of walls of pores of the larch charcoal produced in a charcoal kiln were destroyed and a number of impurities (probably carbon particles) were present within the pores. In contrast, it was found that the carbonized material obtained by the microwave heating had ordered pore walls and did not contain impurities in the pores.

EXAMPLE 2

The completely carbonized material obtained in Example 1 was coarsely pulverized and sieved to obtain particles which passed through a sieve opening size of 70 mm but not passed through a sieve opening size of 20 mm. The thus obtained particles (about 110 g) were subjected to an activation treatment in a rotary kiln having a diameter of about 10 cm and a length of 100 cm. Thus, while feeding carbon dioxide gas at a rate of 3 liters per minute, the particles in the kiln were heated at a heating rate of 4° C. per minute and then maintained at 880° C. for 2 hours. The treated particles were allowed to be cooled and taken out from the kiln. The yield of the activated particles was about 40 g, which is very high in the production of activated carbonized materials. While the weight was reduced and a slight shrinkage was observed as a result of the activation treatment, the carbonized materials substantially maintained their original shape. The specific surface area of the activated carbonized material was measured with a specific surface meter according to the BET method. It was revealed that the specific surface area of the carbonized material was 830–900 $m^2/g$ which was greater than that of commercially available activated carbon powder. When the incompletely carbonized material obtained by the microwave irradiation and containing an uncarbonized surface region was subjected to an activation treatment in the same manner as above, the activated product had a specific surface area of 720 $m^2/g$ which was smaller by about 100 $m^2/g$ than that of the activated, completely carbonized material. It is without saying that the properties of the activated carbonized material are further improved by increasing the activation treatment time, although the yield decreases. When the activated carbonized material was added to a brown pyrolignous acid liquid obtained from a broadleaf tree, the liquid turned colorless. The activated carbonized material had excellent decoloring properties. Thus, the present invention can easily produce large sized activated carbonized material having a high grade without using a binder or a granulating agent.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

The teachings of Japanese Patent Application No. 2000-361508 (filed Nov. 28, 2000), inclusive of the specification and claims, are hereby incorporated by reference herein.

What is claimed is:

1. A process of producing a carbonized material from a biomass, comprising the steps of:
   (a) treating the biomass with a microwave for a period of time sufficient to carbonize an inner region thereof but insufficient to carbonize an outer region thereof, thereby obtaining a partly carbonized product wherein the outer uncarbonized region is 5–70% by weight of the partly carbonized product;
   (b) contacting said partly carbonized product with an oxidizing gas for a period of time sufficient to carbonize said outer region, thereby obtaining a completely carbonized product; and
   (c) cooling said completely carbonized product in a non-oxidizing atmosphere.

2. A process as claimed in claim 1, further comprising subjecting the cooled product obtained in step (c) to a gas activation treatment.

3. A process as claimed in claim 1 wherein the outer uncarbonized region is 10–30% by weight of the partly carbonized product.

4. A process as claimed in claim 1 wherein the completely carbonized product has a specific surface area of at least 400 $m^2/g$ as measured by BET.

5. A process as claimed in claim 1 wherein the completely carbonized product has a specific surface area of at least 500 $m^2/g$ as measured by BET.

6. A process as claimed in claim 1 wherein the completely carbonized product has a specific surface area of no more than 660 $m^2/g$ as measured by BET.

7. A process as claimed in claim 1 wherein the partly carbonized product contacted in step (b) has a temperature in the inner region of 300–1000° C.

8. A process as claimed in claim 1 wherein the volume of one piece of the biomass is at least 70 $cm^3$.

9. A process as claimed in claim 1 wherein said contacting with the oxidizing gas is terminated when flame is no longer formed.

* * * * *